US012332919B1

(12) United States Patent
Lanier et al.

(10) Patent No.: US 12,332,919 B1
(45) Date of Patent: Jun. 17, 2025

(54) LEDGER RECONCILIATION

(71) Applicant: Ikigai Labs, Inc., San Francisco, CA (US)

(72) Inventors: Nathaniel Clinton Lanier, Boston, MA (US); Devavrat Dilitkumar Shah, Newton, MA (US)

(73) Assignee: Ikigai Labs, Inc., San Francisco, CA (US)

( * ) Notice: Subject to any disclaimer, the term of this patent is extended or adjusted under 35 U.S.C. 154(b) by 0 days.

(21) Appl. No.: 18/938,483

(22) Filed: Nov. 6, 2024

(51) Int. Cl.
*G06F 16/00* (2019.01)
*G06F 16/2455* (2019.01)
*G06F 16/28* (2019.01)

(52) U.S. Cl.
CPC ........ *G06F 16/285* (2019.01); *G06F 16/2455* (2019.01)

(58) Field of Classification Search
CPC .......................... G06F 16/285; G06F 16/2455
USPC .......................................................... 707/737
See application file for complete search history.

(56) References Cited

U.S. PATENT DOCUMENTS 10,586,019 B1 * 3/2020 Dowling .............. G06Q 20/145 707/707
11,074,660 B1 * 7/2021 Kunz ..................... G06Q 40/12 707/707
11,971,862 B1 * 4/2024 Han ..................... G06Q 20/401 707/707
2023/0013074 A1 * 1/2023 Kikinis ............ G06Q 20/40145 707/707
2024/0193162 A1 6/2024 Dharaskar et al.

OTHER PUBLICATIONS

Veritas, "Q & A on Available Balance," available at https://www.veritasfcu.org/qa-available-balance/. (Year: 2024).*
Pollock, "Implementing Tags in QuickBooks Online," available at https://www.firmofthefuture.com/accounting/implementing-tags-in-quickbooks-online/ (Year: 2021).*

* cited by examiner

*Primary Examiner* — Alexandria Y Bromell
(74) *Attorney, Agent, or Firm* — Occhiuti & Rohlicek LLP

(57) ABSTRACT

A data processing system uses as input one or more tables representing financial transactions in records to those tables. The system identifies groups of transactions (and associate records or entries) in those tables as corresponding to distinct events, and may present indication of the grouping to a user of the system. In some examples, data in the tables is augmented with indicators of the events (e.g., in a further table column) to facilitate further data analysis or presentation.

26 Claims, 3 Drawing Sheets

105
Automatic Data Entry
110
Data
112
Journal
115
Data Editor
120
Reconciler
122
130
Event Processor
100

112

| Date | Amount | Note | Ledger | Trans Id |
|---|---|---|---|---|
| 1/1/2022 | ($47) | Payroll | ABC | 1 |
| 1/4/2022 | ($55) | Materials | XYZ | 2 |
| 1/8/2022 | $43 | Towards payroll of 1/1 | ABC | 3 |
| 1/9/2022 | $4 | Towards payroll of 1/1 | ABC | 4 |

| Date | Amount | Note | Ledger | Trans Id | Event Id | Unmatched |
|---|---|---|---|---|---|---|
| 1/1/2022 | ($47) | Payroll | ABC | 1 | 1 | $0 |
| 1/4/2022 | ($55) | Materials | XYZ | 2 | 2 | ($55) |
| 1/8/2022 | $43 | Towards payroll of 1/1 | ABC | 3 | 1 | $0 |
| 1/9/2022 | $4 | Towards payroll of 1/1 | ABC | 4 | 1 | $0 |

FIG. 2B

LEDGER RECONCILIATION

BACKGROUND OF THE INVENTION

This invention relates to reconciliation of entries in financial ledgers.

Businesses or individuals may make records of financial activity in data tables, often referred to as ledgers or journals (these terms are used somewhat interchangeably in this document notwithstanding certain distinctions in formal accounting practice). For an individual, an example of such a ledger may be a record for a checking account in which each deposit is listed on a separate line, and each check that is written is also listed on a separate line. Conventionally, a deposit or other incoming money in an account that represents an asset, such as a checking account, is referred to as an accounting "debit" and a check or other withdrawal from the account is referred to as a "credit." For the sake of discussion in this document, a "transaction" is a single financial action, such as a deposit or check, that affects balances in one or more accounts.

In the case of a bank account, a business may carry out several related transactions. In this document, such related transactions may relate to a single "event", with the event potentially spanning multiple transactions on multiple days. As an example, a business may have a bank account that it has set up to pay salaries and wages to its employees. In an example, the business may first transfer sufficient funds to cover the salaried and hourly employee payroll runs, for example, with this transfer being done on January 1. Then, on January 8, the business may transfer some of the funds (i.e., write a check) to a payroll company for the salaried workers, and then may transfer additional funds on January 9 for a second payroll run for the hourly employees. These three transactions make up the single business event that might be referred to as the January payroll. The amount of the deposit may exactly match the sum of the two withdrawals. More generally, the amounts may approximately match, for example, with the deposit possibly exceeding the sum of the withdrawals by a relatively small amount, or being smaller than the sum for instance in the case that the account had some remaining funds from the previous month.

As another example, a business may receive one of more bills (invoices) from a vendor. Each one or these may be recorded as a separate transaction in a ledger. At the end of the month, the business may write a check to the vendor to satisfy the invoices. That check would be a separate transaction from those of the invoices. These transactions together can be considered to be an "event" related to services provided by the vendor since the last payment to them. In such an event, the amounts may balance exactly with the check being exactly the sum of the invoices.

A business may have several ledgers, for example, with a separate ledger for different bank accounts. For example, a transfer between one account and another account may appear as separate entries or records (these terms are used somewhat interchangeably in this document) in the separate ledgers. Other ledgers may be associated with assets or liabilities of the business, or income or expenses of the business. So, one transaction may affect multiple of the ledgers, for example, with a deposit to a bank account matching an entry in an income ledger. While there may be a notation to link such related entries in different ledgers (e.g., with a unique "transaction identifier") their relationship may have to be inferred. Use of multiple ledgers may be referred to as "single-entry" accounting. Note that even if there is a unique transaction identifier that links entries in multiple ledgers, there may still be multiple related transactions that form an "event" as discussed above.

Another approach to maintaining ledgers for accounting is referred to a "double-entry" accounting. Such an approach can be thought of as using a table with one row per transaction, and one column per account. For example, there may be a column for a bank account, a column to tally income, and a column to tally expenses. The debits and credits for a single row are enforced to balance exactly. For example, a deposit of cash received from a customer may be a debit in the bank account column, and a credit in the income column, and these amounts are exactly equal. A single table is not required, and equivalent principles can be implemented by enforcing balancing of credits and debits in entries in multiple separate tables that reference a same transaction identifier.

There is a need to identify sets of related transactions to identify distinct events in the financial history.

SUMMARY OF THE INVENTION

In one aspect, in general, a data processing system uses as input one or more tables representing financial transactions in records to those tables. The system identifies groups of transactions (and associate records or entries) in those tables as corresponding to distinct events, and may present indication of the grouping to a user of the system. For example, related records may be colored or highlighted to show their related status. In some examples, data in the tables is augmented with indicators of the events (e.g., in a further table column) to facilitate further data analysis or presentation. The system makes use of various indicia of whether different records correspond to a single event. One indicator (i.e., indicum) is that the records have values (i.e., credits or debits) that together balance (e.g., the values sum to zero, total credits are equal to total debits). Another indicator is that that text "memo" or descriptor fields are textually similar or otherwise related (e.g., semantically, or via business processes). Another indicator is a temporal relationship between records or transactions. For example, the temporal separation may be an indicator with less separation being an indicator of more likely relationship. As another example, the timing or sequencing of two or more transactions may be an indicator of a particular type of event.

In another aspect, in general, a machine learning system processes user feedback indicating relationship of sets of records or transactions in one or more tables representing financial transactions. This feedback is processed to determine values of configurable parameters of the system in a process referred to as "training", and the system then predicts further grouping of records or transactions in the tables (e.g., existing or newly entered after the training).

A technical improvement that is addressed by one or more embodiments is in the technical field of software-based accounting and the design, use, and/or maintenance of underlying database systems for such accounting. In particular, while existing software accounting systems may be able to function without the identification of related records in an accounting database (e.g., relying only on data that is entered by users), the automated addition of implied record relationships in a database that do not have to be entered by a user improves technology by enabling or making more efficient operations involving groups of related records and/or by automatically and quickly (i.e., with low latency after the data becomes available) identifying erroneous, duplicated, and/or fraudulent entries. Such rapid response can allow for an entry to be corrected or removed before it is relied upon for other operations. The identification of records that are not groups as expected can also be used to automatically identify error or failures of operating procedures, for instance arising from missed collections, overpayments and duplicate invoices or payments.

Another aspect of a technical improvement involves an improved interactive user interaction (e.g., via a graphical user interface display) which provides perceptually immediate feedback with records being shown with their relationships and/or lack of relationships with other records, thereby limiting entry of erroneous data into the accounting system.

Another aspect of the technical improvement is the ability to learn relationships between records, for example, to use input from users identifying related records and/or to adapt to changes of relationships over time (e.g., through incremental training or adaptation) thereby improving the accuracy and/or timeliness of grouping of related records. The use of a parameterized machine learning system (e.g., based on neural networks and/or classical modeling, forecasting, and/or optimization techniques) can provide a technical advantage in accuracy, for example, as compared to heuristic approaches.

Aspects can include one or more of the following features.

Processing the first data according to grouping of records includes at least one of determining records of the first plurality of records that belong to a same group, and determining a record that does not belong to any group of the groups of related records, and further includes causing further processing of the data of determined record or records based on said processing of the first data.

Processing the first data according to the groupings includes identifying an anomalous record in the first data according to the groupings.

Identifying the groups of related records includes computing aggregates of values of the first field in said groups of related records.

Processing the first data according to the groupings including identifying an anomalous group of records according to an aggregate of the values of the first field in said anomalous group.

Processing the first data according to the groupings includes presenting visual information to a user via a graphical user interface indicating at least one of said groups or indicating at least one record that is not a member of said groups.

Receiving the first data for the first plurality of records comprises receiving said data from the user via the graphical user interface, and wherein the presenting of the visual information is in response to the receiving of one or more records of the first data from the user.

Computing the aggregates includes determining a degree of balance of the first quantity according to a total of increase in the first quantity and a total decrease in the first quantity, and wherein identifying the groups includes determining a best overall balance of the first quantity over the groups of the plurality of groups.

The first quantity represents a monetary quantity, the balance of the first quantity is a sum or said monetary quantity, and the overall balance represents a measure of the sums of said monetary quantity relative to a zero sum.

Identifying the groups of related records comprises forming a bipartite graph from the first data, with nodes of a first type representing respective records in which values of the first field of said records each represents an increase in the first quantity, and nodes of a second type representing respective records in values of the first field in said records each represents a decrease in the first quantity, and performing an optimization procedure on said bipartite graph.

The optimization procedure comprises a max matching procedure, and the max matching procedure comprises a min cost max flow procedure.

Grouping records of the first plurality of records comprises computing a quantitative similarity between records of pairs of records of said plurality of records, and wherein the grouping of said records is according to a preference for grouping pairs of records with greater computed quantitative similarity.

The plurality of fields further includes one or more fields other than the first field, and wherein computing the quantitative similarity between records comprises computing a quantitative similarity between fields of the one or more fields of said records, and combining the quantitative similarities of said fields to form the quantitative similarity between said records.

The first data for a first plurality of records comprises financial data for a plurality of financial transactions, and wherein each record includes the first field the plurality of fields, including the first field and at least another field comprising a text data for the record, and wherein grouping the records of the first plurality of records includes grouping said records according the values of the first field and similarity of the another field between pairs of said records.

Computing the quantitative similarity between records comprises applying a trained machine learning procedure to determine said similarity.

The method further comprises training the machine learning procedure by determining configurable parameters of said procedure using data representative at least one of prior groupings of records and user feedback regarding such prior grouping.

Other features and advantages of the invention are apparent from the following description, and from the claims.

BRIEF DESCRIPTION OF THE DRAWINGS

FIGS. 2A-B are tables stored in the data processing system;

DETAILED DESCRIPTION

Figure 1:
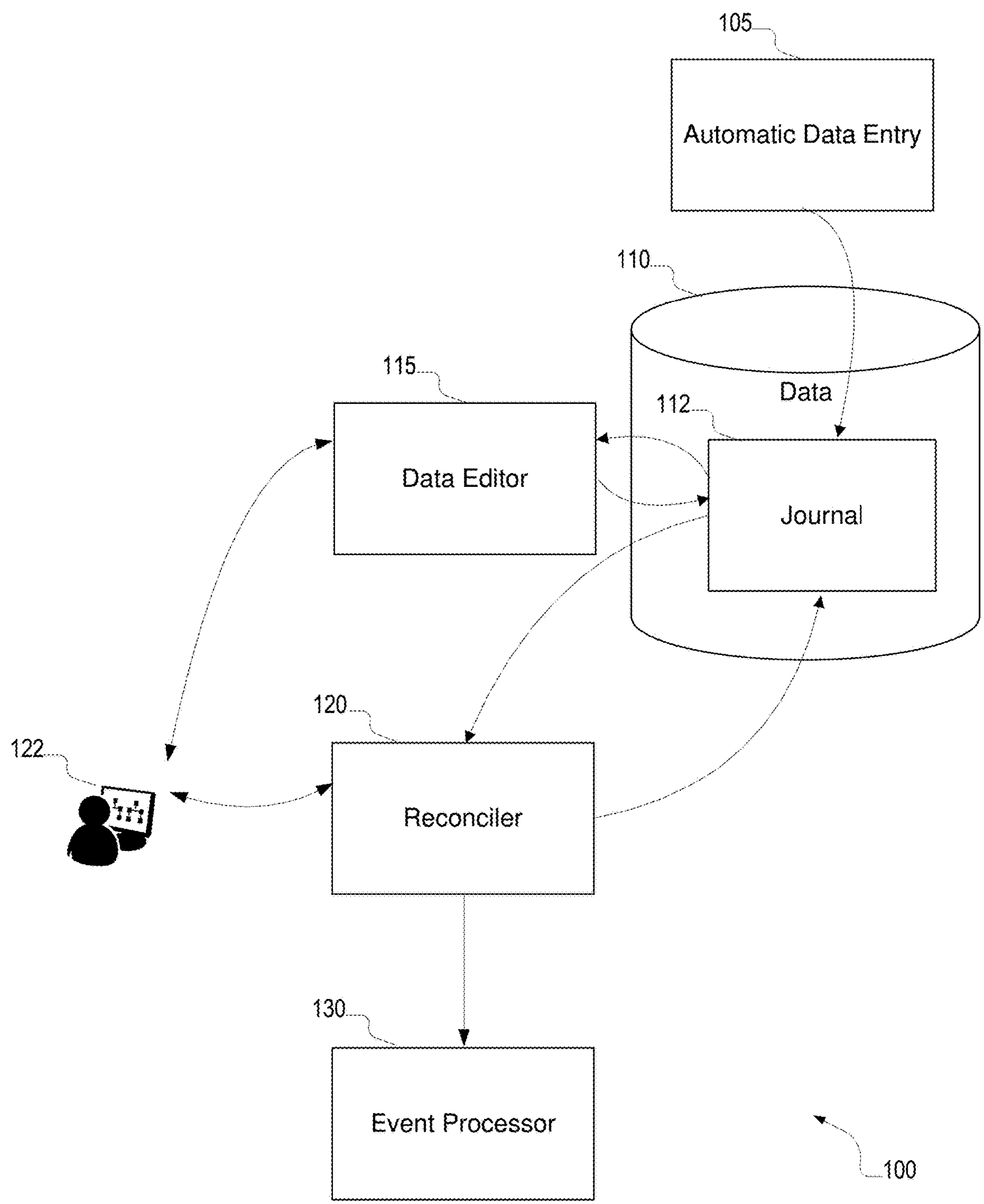
FIG. 1 is a block diagram of a data processing system.

Referring to FIG. 1, a data processing system 100, which in this embodiment is a software-based accounting system, includes a data storage 110 (e.g., a database system, a file system etc.), which includes journals 112 (a representative one of which is illustrated). Data is added to journal 112 via an automated data entry component 105, for example, importing data from other data processing systems or accepting "live" data, such as ongoing financial transaction data. In some cases, such externally generated data provide related records from different external sources without those records being linked by explicit relationships coded in the data. A user 122 may interact with the system, for example via a graphical user interface. The user 122 may access data in the journal or enter or edit data in the journal via a data editor 115. A data processing component referred to as a reconciler 120 processes information in the journal to identify groups of transactions that form events. The identified groupings may be displayed to a user 122 via the graphical interface, stored in or in association with the journal 112, and/or may be passed along to further processing components such as an illustrated event processor 130.

Embodiments of the approaches described in this document may be implemented using software comprising instructions stored on non-transitory machine readable media. When these instructions are executed on a physical or virtual processor (e.g., of a computer or other data processing system that has a processor, memory, and associated peripheral components such as a display a graphical user interface), the processor performs steps of the procedures described herein.

An example of journal 112 is illustrated in FIG. 2A. While only four transactions are illustrated, it should be recognized that in practice there may be hundreds, thousands, or even millions of transactions in such a journal. The journal 112 is typically a chronological record of financial transactions, or at least the records comprise date and/or time information that implies a chronological ordering. Each transaction (i.e., record or row of a tabular representation of the journal) has a number of fields in this example. A Date field indicates the date of the transaction, an Amount field indicates a monetary amount associated with the transaction, and a Note field is a text field that has a free format (e.g., human generated text) description of the transaction. A Ledger field relates to a grouping of transactions, for example, according to their type. In some examples, each ledger type has a separate table of the transactions for the corresponding type of transactions. A Transaction Id is a unique identifier (here a unique positive integer) for each transaction.

In this illustrative example, the Jan. 1, 2024 transaction (id=1) represents a deposit of $47, with the notation "Payroll" and an association with a ledger "ABC". The next transaction (id=2) represents a deposit of $55, with the notation "Materials" and the associated ledger "XYZ". The next transaction (id=3) is a withdrawal of $43 with a notation "Towards payroll of 1/1" and associated ledger "ABC" and the next transaction (id=4) is another withdrawal of $4 with the same notation and associated ledger.

Based on manual inspection of the journal 112 of FIG. 2A, a human user might conjecture that the transactions 1, 3, and 4 represent a deposit of $47 to cover payroll expenses followed by two withdrawals of $43 and $4, respectively, to make payroll payments. Such a conjecture might be based on the user's knowledge of the domain and/or reasoning about the domain. These three transactions can be considered to be an "event" that has a lifecycle from Jan. 1, 2022 to Jan. 9, 2022, and that all relate to payroll. There are several indicia that a person might use to guess that the transactions are related as a single event. First, they are all marked as being on the "ABC" ledger. Also, there is text similarity between the notations because they each have the word "payroll" in them. Finally, each of these transactions is quite close in time, so there is some likelihood that they are related. Having grouped transactions 1, 3, and 4 as an event (event id=1), what remains is transaction 2 that is unmatched, or alternatively may be considered to be part of another event (event id=2) where there are not other matching transactions.

One use of such a procedure may be to augment the journal 112, for example, to add columns forming journal 112A shown in FIG. 2B. One additional column has the event id, and a further column has the amount that is not matched in the grouping. Here because transactions 1, 3, and 4 are grouped and their amounts exactly tally to zero, the unmatched amount for each of these transactions is $0, and the unmatched amount for transaction 2 is the full-$55 of the transaction. While the relationship information is shown as a further column in FIG. 2B, it should be recognized that there are other technical ways of adding the relationship references to a database, for example, using relational database techniques with one additional table having one record per group, and a second additional table linking records of the original data with the group records of the first additional table.

Referring back to FIG. 1, the reconciler implements an automated procedure to find the groups of events in the journal 112 using techniques that are not those that would be performed in the human mind or with pencil and paper. Rather, in this embodiment, an analogous communication capacity problem is formulated, and the solution to the communication problem is used to identify the groups of transactions.

Figure 3:
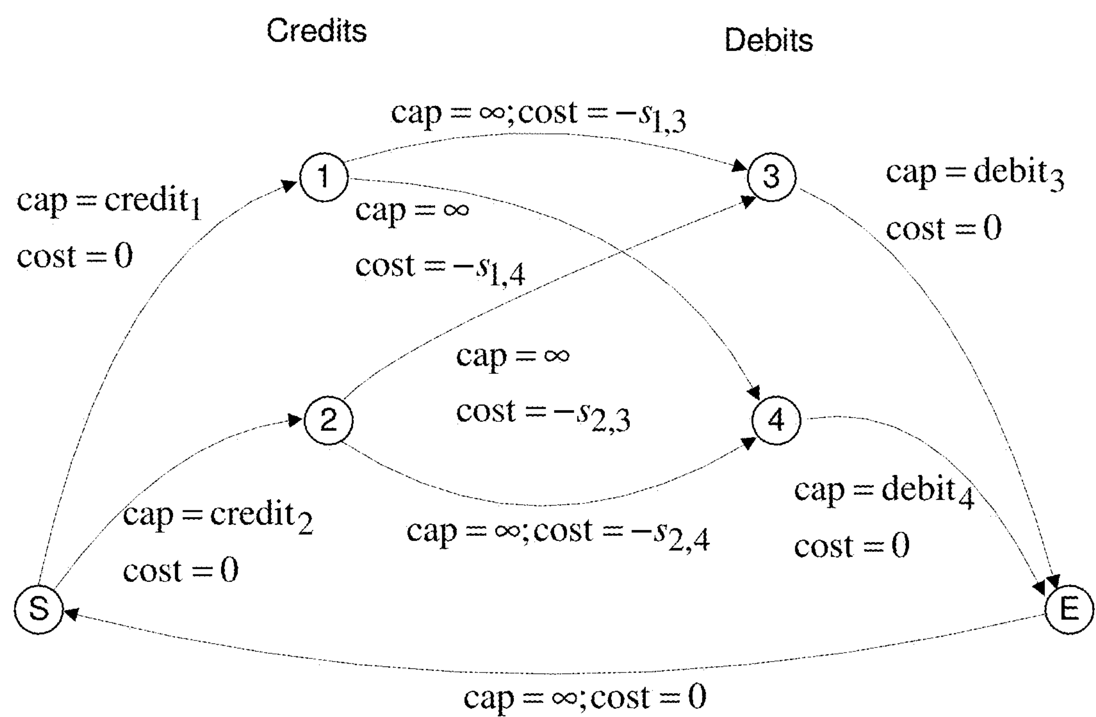
FIG. 3 is an illustration of a transaction matching procedure.

Referring to FIG. 3, a communication problem associated with the journal 112 of FIG. 2A is illustrated as a "min cost max flow" communication problem. In such a problem, a communication system has a set of nodes, and links between the nodes each have a capacity and a cost rate. The capacity is the maximum communication rate on the link, and the cost rate is a cost per unit communication rate. The goal is to find the maximum flow rates on the links, and if there are alternative solutions that achieve the same rates, the one where the lowest total cost summed over the links is chosen.

In this formulation, there are N+2 nodes in the communication system, where N is the number of transactions in the journal. As illustrated in FIG. 3, the nodes are labelled with their associated transaction id's, and the two extra nodes are labelled "S" (e.g., start), and "E" (e.g., end). The transactions are partitioned into those transactions that have negative amounts (i.e., are "Credits") and those that have positive amounts (i.e., are "Debits"). Credit nodes have links to debit nodes, but there are no links between pairs of credit nodes or pairs of debit nodes. Such a network may be referred to as a "bipartite" network. The start node has a link to each of the credit nodes, and each debit node has a link to the end node, and there is a link from the end node back to the start node. Therefore, the maximum flow forms a cycle from start to end and back. The min cost max flow approach is a particular way of solving a maximum matching on this bipartite network (graph). There are a number of efficient and well-known ways of computationally efficient ways of determining the max flow, for example, using the Ford-Fulkerson method.

Capacities of the links are set as follows. Each link from the start node to a credit node has a capacity equal to the negative of the amount of the transactions associated with that node. For example, the link from node S to node 1 has a capacity of credit, =47. Similarly, the capacity from node S to node 2 is 55. The capacity from each debit node to the end node is the amount of the corresponding transaction. For example, the capacity of the link from node 3 to node E is $debit_3$=43 and the capacity from node 4 to E is 4. The capacity of each of the links between credit nodes and debit nodes is infinite, as is the capacity from the end node E to the start node S.

It should be recognized as absent consideration of the cost rates on the links, there are many solutions to a max flow through this network. For example, a max flow rate of 47 may correspond to a flow of 47 (i.e., at capacity) from node S to node 1 and no flow from node S to node 2, or may correspond to no flow from node S to node 1 and a flow of 47 from node S to node 2 (i.e., below capacity). Therefore, the cost rates are selected in order to prefer the former solution, which corresponds to the manually identified grouping, rather than the latter solution.

The cost rates on the links from credit nodes to debit nodes are determined based on a similarity of the transactions. These similarities are computed by an automated procedure, for example, implementing an algorithmic computation or alternatively using a learned (e.g., parameterized) function.

One way to compute the similarity between a first transaction and a second transaction is to consider all the columns other than the Amount column of each of these transactions, and compute a similarity of the values of the corresponding values in each column. By "similarity" we are referring to a quantity that is more positive the more similar the values are. Alternatively, a dissimilarity or "distance" between the values can be used, and in the description below, when a similarity quantity is used, the negative or an inverse of a dissimilarity or distance may be used.

Various similarity computations may be used depending on the data types of the respective columns. For example, a similarity between date values may be based on the number of days between the dates. So that closer dates have smaller similarity values, a negative of the number of days between the dates may be used. Similarly, other numerical columns can use the difference in their values. For text values, any of a number of string similarity or distance functions may be used. One such example is a minimum edit distance between the strings, with particular costs incurred for each insertion, deletion, or substitution. An alternative is to use an overall similarity between records, for example, using procedures described in co-pending U.S. application Ser. No. 18/581,642, published as US 2024/0193162, "System and Method for Joining Datasets", which is incorporated herein by reference.

Turning back to FIG. 3, the cost rate from node 1 to node 3 is set to the negative of the similarity of transaction 1 and transaction 3 ($-S_{1,3}$). Because these transactions are relatively similar, the cost will be quite negative. The cost rate from node 2 to node 3 is set to the negative of the similarity of transaction 2 and transaction 3 ($-s_{2,3}$). Because these transactions are quite dissimilar, the cost with the more positive than the cost from node 1 to node 3. Similarly, the cost of the link from node 1 to node 4 will be more negative than the cost of the link from node 2 to node 4.

Based on these costs, the max flow solution of the communication problem remains a total flow of 47, with that flow passing from node S to node 1, and then 43 flow passing to node 3 and 4 flow passing to node 4. Note that the links from S to 1, 3 to E, and 4 to E, are all at their capacity, and the link from S to 2 is at zero (i.e., under capacity). The amounts that these links are under capacity can be considered to be the unmatched amount of the transaction.

In practice, the amounts of transactions that should be grouped may not exactly tally to zero. For example, if transaction 1 had been an "over" deposit of $50, for example, because there was an over-estimate of the payroll payments that would be made, the unmatched amount for transaction 1 would be $3. In the communication problem formulation, this would correspond to the capacity of the link from S to 1 being 50, yet the max flow being only 47.

In general, the approach illustrated in FIG. 3 had only a single group of transactions. More generally, there would be multiple groups of transactions that would be identified by using the min cost max flow formulation. In order to identify the groups of transactions, linkage between transaction nodes with credit-to-debit node links with non-zero flow is used to identify separate groups. That is, two nodes are in the same event if there is a part through (undirected) links with non-zero flow. For example, in the example illustrated in FIG. 3, likes 1 to 3 and 1 to 4 are the only credit-to-debit node links in the min cost max flow solution with non-zero flow, and therefore nodes 1, 3, and 4 form a linked subset of nodes representing a single event.

A number of alternative approaches may be used to quantify similarity between pairs (or more generally subsets of two or more) records in the journal. In addition to techniques described above, a number of machine learning techniques may be used. In one such example, text fields may be compared and their similarity scored based on natural language techniques to assess their semantic similarity. A model for such scoring may be trained on general text, or may be trained on a training database of related records in journals. For example, each text field may be mapped to a vector embedding and the embeddings are compared, for example, by a vector distance, to assess similarity. Models to determining similarity between entire records, or specific similarities between fields of records that are then aggregated to determine record-to-record similarity, may be trained or "fine tuned" on data that is representative of a particular database. For instance, the models can be updated as more and more groups of related records are identified, thereby making the models specific to the database and potentially adaptive to changes in the data characteristics over time, and may be updated based on user feedback regarding the quality of proposed groupings of records.

Approaches to quantifying the relationship between records in the journal may consider a chronological sequence of multiple records. As introduced above, the time difference between records may contribute to a measure of similarity of records. More complex chronology may be configured into the system and/or learned from data. As a simple example, vendor invoices generally occur before a corresponding payment to the vendor is made. Transfers of cash to a payroll account are generally made before the funds are needed for withdrawal to make payroll. The day of the week or day of the month or month of the year may affect whether a type of group of related records occurs. For example, payroll may be made on the 15th and 30th of a month, and end-of-year bonuses may be made in December. In approaches that score entire groups of records together, there may be an identification (e.g., by clustering) of a number of different types of groups of records, thereby not only identifying related records, but also the type of relationship. For example, some groups may be based on vendor invoices and payments, while other groups may be associated with funding and disbursing funds from a payroll account. Such use of different types of groups may increase the accuracy of the grouping.

Approaches to finding the best groupings of records does not necessarily use a "min cost max flow" approach as discussed above. Other alternatives include use of an iterative assignment and reassignment approach. One such approach uses a Genetic Algorithm procedure. Selection of records to change their group assignment in an iterative approach can be made at random, or made according to a rule, for instance using a machine-learning rule that uses a Reinforcement Learning methodology.

The approaches described above may be integrated into accounting/financial software systems of various levels of complexity (e.g., Inuit Quicken), and may be used to reconcile "ad-hoc" records that are not necessarily under the control of such software. In some implementations, such ad-hoc records may be matched an formed into groups as part of importing those records into a more formal accounting system. Furthermore, even if the data is in a formal accounting system, the groupings of records may be very valuable when performing an audit function, for example, to identify any irregularities in the data.

As discussed above, the automated addition of implied record relationships in a database that do not have to be entered by a user may improve the financial tracking technology by enabling or making more efficient operations involving groups of related records and/or by automatically and quickly (i.e., with low latency after the data becomes available) identifying erroneous, duplicated, and/or fraudulent entries. Such rapid response can allow for an entry to be corrected or removed before it is relied upon for other operations. For example, if records stream continuously into a journal, the irregularities (e.g., fraudulent entries, duplicates, etc.) can be identified more quickly and accurately than would be practical for a human monitoring the journals. As one such example, a bank may monitor transactions in a bank account to detect unusual ungrouped transaction records.

As introduced above with reference to FIG. 1, a user interface may display information from the reconciler 120 to provide essentially immediate feedback with records being shown with their relationships and/or lack of relationships with other records. For example, related records may be displayed in distinct colors (e.g., each group in a different color, or each type of group in a distinct color), or ungrouped records may be displayed in a different text style than grouped records. The user may also correct the groupings proposed by the reconciler 120 via the interface, for example, enabling adaptation of grouping functions or models so that further grouping proposed by the reconciler become more accurate.

Implementations of the approaches described above may make use of software, including non-transitory machine-readable media with instructions stored on the media. These instructions may be executed by physical processors, such as physical general-purpose processors and/or special-purpose computation processors such as Graphics Processing Units (GPUs), Tensor Processing Units, and the like, or executed by virtual processors (e.g., a Java Virtual Machine), with the virtual processor being in turn implemented using instructions that execute on a physical processor. Some implementations may make use of special-purpose hardware (e.g., FPGAs or ASICs) to perform some of the data manipulation described above.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for storing and retrieving data in a computer memory comprising:

configuring said memory according to one or more tables for storing a plurality of records, each record having a plurality of fields, including at least a first field for representing an increase or a decrease in a first quantity;

further configuring said memory with a second column in at least one table for identifying a plurality of groups of related records for the plurality of records;

receiving first data for a first plurality of records, including for each record receiving a data column representing either an increase or a decrease in a first quantity, the records lacking data for identifying the plurality of groups of the plurality of records;

grouping records of the first plurality of records, including processing the first data to determine data for the column identifying the groups of related records, and storing said determined data in the second column in the at least one table; and processing the first data according to grouping of records of the first plurality or records, including retrieving data in the second column;

wherein processing the first data according to grouping of records includes at least one of determining records of the first plurality of records that belong to a same group, and determining a record that does not belong to any group of the groups of related records, and further includes causing further processing of the data of determined record or records based on said processing of the first data;

wherein identifying the groups of related records includes computing aggregates of values of the first field in said groups of related records, and wherein computing the aggregates includes determining a degree of balance of the first quantity according to a total of increase in the first quantity and a total decrease in the first quantity, and wherein identifying the groups includes determining a best overall balance of the first quantity over the groups of the plurality of groups.

2. The method of claim 1, wherein processing the first data according to the groupings includes identifying an anomalous record in the first data according to the groupings.

3. The method of claim 1, wherein processing the first data according to the groupings including identifying an anomalous group of records according to an aggregate of the values of the first field in said anomalous group.

4. The method of claim 1, wherein processing the first data according to the groupings includes presenting visual information to a user via a graphical user interface indicating at least one of said groups or indicating at least one record that is not a member of said groups.

5. The method of claim 4, wherein receiving the first data for the first plurality of records comprises receiving said data from the user via the graphical user interface, and wherein the presenting of the visual information is in response to the receiving of one or more records of the first data from the user.

6. The method of claim 1, wherein the first quantity represents a monetary quantity, the balance of the first quantity is a sum or said monetary quantity, and the overall balance represents a measure of the sums of said monetary quantity relative to a zero sum.

7. The method of claim 1, wherein identifying the groups of related records comprises forming a bipartite graph from the first data, with nodes of a first type representing respective records in which values of the first field of said records each represents an increase in the first quantity, and nodes of a second type representing respective records in values of the first field in said records each represents a decrease in the first quantity, and performing an optimization procedure on said bipartite graph.

8. The method of claim 7, wherein said optimization procedure comprises a max matching procedure, and the max matching procedure comprises a min cost max flow procedure.

9. The method of claim 1, wherein grouping records of the first plurality of records comprises computing a quantitative similarity between records of pairs of records of said plurality of records, and wherein the grouping of said records is according to a preference for grouping pairs of records with greater computed quantitative similarity.

10. The method of claim 9, wherein the plurality of fields further includes one or more fields other than the first field, and wherein computing the quantitative similarity between records comprises computing a quantitative similarity between fields of the one or more fields of said records, and combining the quantitative similarities of said fields to form the quantitative similarity between said records.

11. The method of claim 9, wherein the first data for a first plurality of records comprises financial data for a plurality of financial transactions, and wherein each record includes the first field the plurality of fields, including the first field and at least another field comprising a text data for the record, and wherein grouping the records of the first plurality of records includes grouping said records according the values of the first field and similarity of the another field between pairs of said records.

12. The method of claim 9, wherein computing the quantitative similarity between records comprises applying a trained machine learning procedure to determine said similarity.

13. The method of claim 12, further comprising training the machine learning procedure by determining configurable parameters of said procedure using data representative at least one of prior groupings of records and user feedback regarding such prior grouping.

14. A system for storing and retrieving data in a computer memory comprising:

- means for configuring said memory according to one or more tables for storing a plurality of records, each record having a plurality of fields, including at least a first field for representing an increase or a decrease in a first quantity;
- means for further configuring said memory with a second column in at least one table for identifying a plurality of groups of related records for the plurality of records;
- means for receiving first data for a first plurality of records, including for each record receiving a data column representing either an increase or a decrease in a first quantity, the records lacking data for identifying the plurality of groups of the plurality of records;
- means for grouping records of the first plurality of records, including processing the first data to determine data for the column identifying the groups of related records including computing aggregates of values of the first field in said groups of related records, wherein computing the aggregates includes determining a degree of balance of the first quantity according to a total of increase in the first quantity and a total decrease in the first quantity, and wherein identifying the groups includes determining a best overall balance of the first quantity over the groups of the plurality of groups, and storing said determined data in the second column in the at least one table identifying the groups of related records; and
- means for processing the first data according to grouping of records of the first plurality or records, including retrieving data in the second column.

15. Non-transitory machine readable media comprising instructions stored thereon, said instructions when executed by a data processing system cause storing and retrieving of data in a computer memory, including:

- configuring said memory according to one or more tables for storing a plurality of records, each record having a plurality of fields, including at least a first field for representing an increase or a decrease in a first quantity;
- further configuring said memory with a second column in at least one table for identifying a plurality of groups of related records for the plurality of records;
- receiving first data for a first plurality of records, including for each record receiving a data column representing either an increase or a decrease in a first quantity, the records lacking data for identifying the plurality of groups of the plurality of records;
- grouping records of the first plurality of records, including processing the first data to determine data for the column identifying the groups of related records, and storing said determined data in the second column in the at least one table; and
- processing the first data according to grouping of records of the first plurality or records, including retrieving data in the second column;
- wherein processing the first data according to grouping of records includes at least one of
- determining records of the first plurality of records that belong to a same group, and
- determining a record that does not belong to any group of the groups of related records, and further includes causing further processing of the data of determined record or records based on said processing of the first data;
- wherein identifying the groups of related records includes computing aggregates of values of the first field in said groups of related records, and
- wherein computing the aggregates includes determining a degree of balance of the first quantity according to a total of increase in the first quantity and a total decrease in the first quantity, and wherein identifying the groups includes determining a best overall balance of the first quantity over the groups of the plurality of groups.

16. The system of claim 14, wherein processing the first data according to grouping of records includes at least one of

- determining records of the first plurality of records that belong to a same group, and
- determining a record that does not belong to any group of the groups of related records,
- and further includes causing further processing of the data of determined record or records based on said processing of the first data.

17. The system of claim 16, wherein processing the first data according to the groupings includes identifying an anomalous record in the first data according to the groupings.

18. The system of claim 14, wherein processing the first data according to the groupings including identifying an anomalous group of records according to an aggregate of the values of the first field in said anomalous group.

19. The system of claim 14, wherein the system further comprises a graphical user interface, and wherein processing the first data according to the groupings includes presenting visual information to a user via the graphical user interface indicating at least one of said groups or indicating at least one record that is not a member of said groups.

20. The system of claim 19, wherein receiving the first data for the first plurality of records comprises receiving said data from the user via the graphical user interface, and wherein the presenting of the visual information is in response to the receiving of one or more records of the first data from the user.

21. The system of claim 14, wherein the first quantity represents a monetary quantity, the balance of the first quantity is a sum or said monetary quantity, and the overall balance represents a measure of the sums of said monetary quantity relative to a zero sum.

22. The system of claim 14, wherein identifying the groups of related records comprises forming a bipartite graph from the first data, with nodes of a first type representing respective records in which values of the first field of said records each represents an increase in the first quantity, and nodes of a second type representing respective records in values of the first field in said records each represents a decrease in the first quantity, and performing an optimization procedure on said bipartite graph, wherein said optimization procedure comprises a max matching procedure, and the max matching procedure comprises a min cost max flow procedure.

23. The system of claim 14, wherein grouping records of the first plurality of records comprises computing a quantitative similarity between records of pairs of records of said plurality of records, and wherein the grouping of said records is according to a preference for grouping pairs of records with greater computed quantitative similarity.

24. The system of claim 23, wherein the plurality of fields further includes one or more fields other than the first field, and wherein computing the quantitative similarity between records comprises computing a quantitative similarity between fields of the one or more fields of said records, and combining the quantitative similarities of said fields to form the quantitative similarity between said records.

25. The system of claim 23, wherein the first data for a first plurality of records comprises financial data for a plurality of financial transactions, and wherein each record includes the first field the plurality of fields, including the first field and at least another field comprising a text data for the record, and wherein grouping the records of the first plurality of records includes grouping said records according the values of the first field and similarity of the another field between pairs of said records.

26. The system of claim 23, wherein computing the quantitative similarity between records comprises applying a trained machine learning procedure to determine said similarity, and the system further comprises a means for training the machine learning procedure by determining configurable parameters of said procedure using data representative at least one of prior groupings of records and user feedback regarding such prior grouping.

* * * * *